United States Patent [19]

Nelson

[11] 4,230,977
[45] Oct. 28, 1980

[54] SPEED CONTROL FOR ELECTRIC MOTOR

[76] Inventor: David A. Nelson, 22031 Dumetz Ave., Woodland Hills, Calif. 91364

[21] Appl. No.: 921,771

[22] Filed: Jul. 3, 1978

[51] Int. Cl.³ .............................................. H02P 5/06
[52] U.S. Cl. .................................. 318/305; 318/302; 318/343; 318/434; 318/548
[58] Field of Search ............... 318/255, 257, 258, 261, 318/268, 269, 273, 301, 302, 305, 339, 343, 398, 375, 432, 434, 663, 543–551

[56] References Cited

U.S. PATENT DOCUMENTS

| 3,021,466 | 2/1962 | Greening et al. | 318/434 |
| 3,604,993 | 9/1971 | Volkert | 318/302 |
| 3,715,642 | 2/1973 | Walter | 318/269 |

Primary Examiner—J. V. Truhe
Assistant Examiner—John W. Redman
Attorney, Agent, or Firm—Keith D. Beecher

[57] ABSTRACT

A speed control system for an electric motor is provided for use, for example, in dental offices to control dental drill motors, and the like, which in one embodiment provides speed control from either a foot-operated potentiometer or a panel hand-operated potentiometer. The system includes a negative resistance generating circuit which maintains constant speed of the motor for any particular speed setting in the presence of variations in the mechanical load on the motor. The circuit also provides dynamic braking which immediately slows the motor and brings the motor to an almost immediate stop when the speed control potentiometers are returned to their neutral positions. A guardian circuit is also provided in the system which prevents motor burn-up in the presence of a sustained overload condition.

7 Claims, 2 Drawing Figures

SPEED CONTROL FOR ELECTRIC MOTOR

BACKGROUND OF THE INVENTION

Constant motor speed is maintained by the system of the invention for any particular speed setting in the presence of varying mechanical loads on the motor over a permissible range by cancelling the positive resistance of the motor's rotor. This is achieved by placing a negative resistance in series with the rotor so that the voltage across the inductive impedance of the rotor remains constant for a given speed setting as the mechanical load on the motor varies. The negative resistance is generated by the use of positive and negative feedback in the motor drive amplifier.

Dynamic braking is achieved in the system of the invention by a transistor circuit which is connected to extract energy from the rotor when the rotor is rotating at a speed above a selected level. The dynamic braking circuit extracts energy from the rotor under these conditions until it slows the rotor to the selected rotational speed.

The guardian circuit protects the motor from damage due to sustained overloads, while permitting normal operation in the presence of intermittent overloads of short duration. If an overload is not of sufficient duration or magnitude to cause damage to the motor, the speed control system will continue to supply power to the motor.

The dual action foot and panel control in one embodiment of the invention is connected so that when the panel potentiometer is moved from its minimum position, it takes over the control of the motor, and the foot-operated potentiometer acts only as a switch to turn the motor on or off. In this manner, there is no need for an extra switch to select either the foot-controlled potentiometer or the hand-controlled panel potentiometer.

In another embodiment of the invention, speed is controlled only by the hand-controlled panel potentiometer, and a foot-operated switch is provided whose function is only to turn the system on or off.

DETAILED DESCRIPTION OF THE ILLUSTRATED EMBODIMENTS

Figure 1:
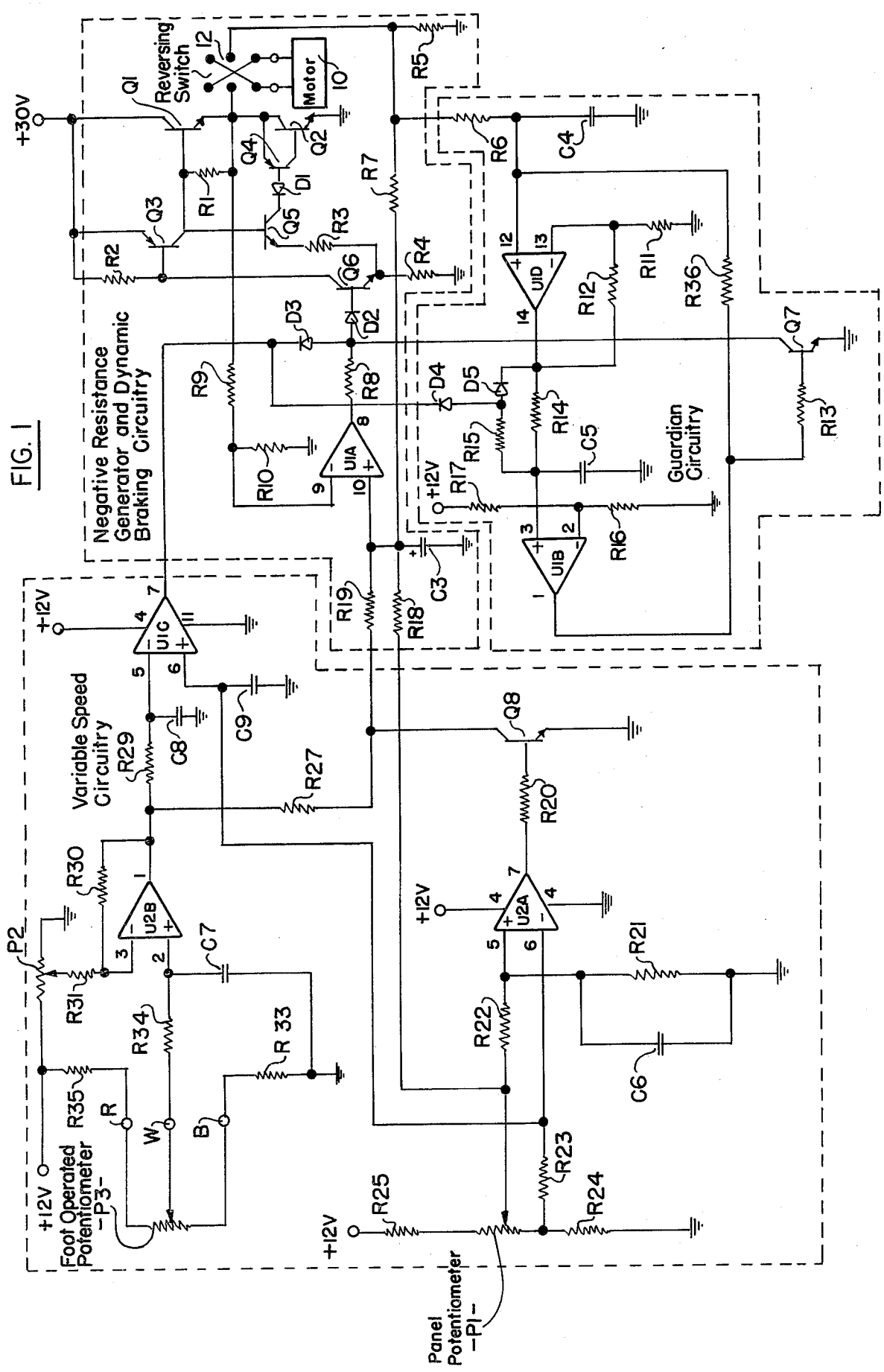
FIG. 1 is a circuit diagram of one embodiment of the invention in which the speed of the motor is controlled by either a hand-operated panel potentiometer or a foot-operated potentiometer.

In the system of FIG. 1, the speed of a motor 10 is controlled by a panel hand-operated potentiometer P1, or by a foot-operated potentiometer P3. The motor, for example, may be a permanent magnet type of electric motor. The motor may be used to drive a dental drill in a dental office. However, it will become clear as the description proceeds that the motor may be used in a variety of other applications. The direction of rotation of the motor may be controlled by a manually operated reversing switch 12.

The potentiometers P1 and P3 are included in circuitry designated "Variable Speed Circuitry". Potentiometer P1 is connected through a resistor R25 to the positive terminal of a 12-volt source, and is also connected to a grounded resistor R24. The junction between the potentiometer and resistor R24 is connected through a resistor R23 to the minus input of a comparator U2A. The plus input of the comparator is connected to a grounded resistor R21 which is shunted by a capacitor C6.

The foot-operated potentiometer P3 is connected through a resistor R35 to the positive terminal of the 12-volt source, and to a ground resistor R33. The wiper of potentiometer P3 is connected through a resistor R34 to the plus input of an amplifier U2B. The plus input of amplifier U2B is also connected to a grounded capacitor C7. The minus input of amplifier U2B is connected through a resistor R31 to the wiper of a potentiometer P2.

Potentiometer P2 is connected between the positive terminal of the 12-volt source and ground. The output of amplifier U2B is connected back to the minus input through a resistor R30, and is also connected through a resistor R29 to the minus input of a comparator U1C. The minus input of comparator U1C is also connected to a grounded capacitor C8, and the plus input of the comparator U1C is connected to the minus input comparator U2A and to a grounded capacitor C9. The output of comparator U2A is connected through a resistor R20 to the base of a grounded emitter transistor Q8.

The output of amplifier U2B is also through a resistor R27 and through a resistor R19 to the plus input of an amplifier U1A. The collector of transistor Q8 is connected to the junction of resistors R27 and R19. The amplifier U1A and other elements to be described, are included in a circuit designated "Negative Resistance Generator and Dynamic Braking Circuitry".

The plus input of amplifier U1A is also connected through a resistor R18 back to the movable arm of potentiometer P1, and to a grounded capacitor C3. The output of amplifier U1A is connected through a resistor R8, and through a diode D2 to the base of an NPN transistor Q6. The output of comparator U1C is connected through a diode D3 to the junction of resistor R8 and diode D2. The emitter of transistor Q6 is connected to a grounded resistor R4 and the collector of transistor Q6 is connected to the base of a transistor Q3. The emitter of transistor Q3 is connected to the positive terminal of a 30-volt source, and the base is also connected to that terminal through a resistor R2. The collector of transistor Q3 is connected to the base of an NPN transistor Q1 and to the base of an NPN transistor Q5. The emitter of transistor Q5 is connected through a resistor R3 back to the emitter of transistor Q6.

The collector of transistor Q5 is connected through a diode D1 to the base of a PNP transistor Q4. The collector of transistor Q4 is connected to the base of a grounded emitter NPN transistor Q2. The collector of transistor Q2 is connected to the emitter of transistor Q4 and to the emitter of transistor Q1. The collector of transistor Q3 is connected through a resistor R1 to a common terminal of reversing switch 12 and through a resistor R9 to the minus input of amplifier U1A. The common terminal of the reversing switch is also connected to the emitter of transistor Q1, to the emitter of transistor Q4, and to the collector of transistor Q2. The minus input is also connected to a grounded resistor R10. The other common terminal of reversing switch 12 is connected to a grounded resistor R5, and through a resistor R7 back to the plus input of amplifier U1A.

The resistor R5 is also connected through a resistor R6 to the plus input of an amplifier U1D in a portion of the system designated "Guardian Circuitry". Resistor R6 is also connected to a grounded capacitor C4. The minus input of amplifier U1D is connected to a grounded resistor R11, and through a resistor R12, diode D5 and resistor R15 to the plus input of a comparator U1B. The output of amplifier U1D is also connected to the plus input of comparator U1B through a resistor R14. The plus input of comparator U1B is connected to a grounded capacitor C5.

The minus input of amplifier U1D is connected to a grounded resistor R11, and through a resistor R12 to the output of the amplifier. The minus input of comparator U1B is connected to a grounded resistor R16 and through a resistor R17 to the positive terminal of the 12-volt source. The output of comparator U1C is connected through a diode D4 to the junction of diode D5 and resistor R13.

The output of comparator U1B is connected back to the plus input of amplifier U1D through a resistor R36, and through a resistor R13 to the base of a grounded emitter NPN transistor Q7. The collector of transistor Q7 is connected to the junction of resistor R8 diode D2 and diode D3.

The use of a low profile foot control for potentiometer P3 with limited up and down movement does not permit the potentiometer P3 to rotate more than a small fraction of a revolution. Thus, the voltage signal from potentiometer P3 must be amplified by amplifier U2B in order to produce a voltage range equal to that produced by the panel potentiometer P1. As mentioned above, in order to allow the speed of motor 10 to be controlled either from the foot-operated potentiometer P3 or from the hand-operated panel potentiometer P1, potentiometer P3 has a dual function as a voltage controlled switch when used in conjunction with the comparator U2A and amplifier U2B.

When the panel potentiometer wiper produces a voltage at the plus input of comparator U2A which is less than the reference voltage produced at the minus input, the foot-operated potentiometer P3 will control the speed of the motor. However, when the voltage at the plus input of comparator U2A is greater than the reference voltage at the minus input, the panel potentiometer P1 will take over and control the speed of the motor. Then, the foot-operated potentiometer P3 acts only to turn the motor on or off. With such a system, and as mentioned above, an extra switch to select either the panel potentiometer P1 or the foot-operated potentiometer P3 for speed control is unnecessary.

The potentiometer P2 controls the direct current offset of amplifier U2B, so that the output of amplifier U2B is zero when the foot-operated potentiometer P3 is at its neutral position. The comparator U1C compares the output of amplifier U2B with the reference voltage at the minus input of amplifier U2A. When the output of amplifier U2B rises above the reference voltage, the output of the comparator U1C goes from zero to +12 volts.

When the output of comparator U1C is zero, diodes D3 and D4 are conductive and the negative resistor and dynamic braking circuitry and the guardian circuitry are both disabled. However, when the output of comparator U1C rises to the 12-volt level, these diodes are back-biased, and both circuits are enabled.

The output of amplifier U2B is also introduced to the plus input of amplifier U1A, so that when the negative resistance generator and dynamic braking circuitry is activated, the speed of the motor 10 may be controlled by the foot-operated potentiometer P3, assuming that the panel potentiometer P1 is at its neutral position. The transistors Q1–Q6 constitute a high voltage high power amplifier which supplies power to the motor 10 through the reversing switch 12 under the control of the foot-operated potentiometer P3, in the mode of operation of the circuit under discussion.

The resistor R9 supplies a negative feedback voltage to the minus input of amplifier U1A, which voltage appears accross resistor R10 Resistors. R5 and R7 supply a positive feedback voltage to the plus input of amplifier U1A, which voltage appears across capacitor C3. The resulting circuitry of amplifier U1A with its positive and negative feedback inserts a negative resistance in series with the rotor of motor 10. This negative resistance effectively cancels the internal resistance of the rotor, so that increases in torque on the motor, with resulting increases in rotor current, do not cause a corresponding decrease in speed. This is because the voltage across the inductive impedance of the rotor remains constant. Therefore, the speed of motor 10 remains constant in the presence of variations in mechanical load. The ratio of resistance R9 to resistance R10 also controls the overall gain of the circuit in order to insure proper operation and stability of the speed control.

The transistor circuitry also has a dynamic braking function, in that transistor Q3 becomes more and more conductive whenever the speed of the motor rises above its present speed, and this transistor effectively produces a load across the rotor which decreases as the speed setting is returned to neutral, so that the motor may be quickly brought to a stop.

Specifically, in the drive mode for the motor 10, as described above, the voltage present at the base of transistor Q6 produces a current flow through resistor R4. Approximately the same amount of current flows through resistor R3 since there is very little collector current in transistor Q6. The ratio of the resistances of resistor R3 to resistor R4 is such that the voltage at the emitter of transistor Q5 is approximately three times the voltage present at the emitter of transistor Q6. The collector current of Q6 allows Q3 to supply current to the bases of Q1 and Q5, and the voltage at the emitter of Q5 is offset only slightly from the voltage at the emitter of Q1. Under these conditions, the transistor circuit provides a large power gain, and the output of the circuit drives the motor.

Now, when the operator begins to decrease the speed setting, the voltage at the output of U1A will decrease. This reduces the current flowing through R3 and R4, which causes the voltage at the base of Q1 to decrease. If the mechanical load on motor 10 is great enough, the motor speed will try to decrease at least as rapidly as the applied voltage is decreasing. In this case, Q1 will remain conducting as previously described, and supply enough power to motor 10 to maintain the desired speed. If the load is not of sufficient magnitude to cause this to happen, Q1 will be turned off as its base voltage falls below that of its emitter. At this point, there will be enough voltage across the base-emitter junction of Q4 and diode D1 to cause them to conduct, since the collector of Q5 will be saturated by base drive from Q3. Thus, Q2 will conduct and energy will be removed from motor 10 until its speed is reduced to the desired setting, at which time, D1, Q4 and Q5 turn off and Q1 turns on again. It the operator removes his foot from the control, this process takes place very rapidly and the motor will come to an almost instant halt. Now, however, both Q1 and Q3 will be off after the motor stops.

The input of the guardian circuit is connected to resistor R5, which resistor monitors the current through the rotor of the motor. If for any reason, the torque applied to the motor is caused to increase above safe limits, so that the rotor current also increases above safe limits, the resulting voltage across the resistor R5 is integrated twice by the guardian circuit to provide a delay of, for example, 5 seconds. Should the overload continue up to five seconds, for example, the output of comparator U1B will rise from zero to +12-volts, so as to render transistor Q7 conductive, and this effectively causes transistor Q6 to be non-conductive so as to terminate the drive to the motor. Also, the output of the comparator is fed back to the plus input of amplifier U1D, so that the circuit operates as a latch, and the input to the motor is maintained cut off until the foot-operated potentiometer is returned to neutral, the capacitor C5 discharges through resistor R15, and the circuit returns to normal.

If the motor 10 is subjected to a series of high torques, which are not above the danger level, these effects are not cumulative in the guardian circuitry. This is because the time constant of resistor R6 and capactior C4 is made relatively low, so that any voltage accumulator across capacitor C5 during any five second interval which does not rise above the maximum threshold is quickly discharged through diode D5 as the output of amplifier U1D returns to a voltage below that of the voltage across C5.

The above-described speed control by the foot-operated potentiometer P3 is functional only when the panel potentiometer P1 is at its minimum position. When the panel potentiometer P1 is at its minimum position, the output of comparator U2A is a minimum, and transistor Q8 is non-conductive, so that the output of the foot-operated potentiometer amplifier U2B may be introduced to the plus input of amplifier U1A. However, whenever the panel potentiometer P1 is moved from its minimum position, transistor Q8 becomes conductive, establishing the junction of resistors R27 and R19 at a fixed voltage slightly above ground, so that the output of amplifier U2B is no longer applied to the input of amplifier U1A. During this latter condition, the voltage from the panel potentiometer P1 is introduced to the plus input of amplifier U1A through resistor R18, so that the panel potentiometer overrides the foot-controlled potentiometer P3 and controls the motor speed, whenever the panel potentiometer is moved from its minimum position. In all other respects, the system of FIG. 1 operates in the manner described above.

Figure 2:
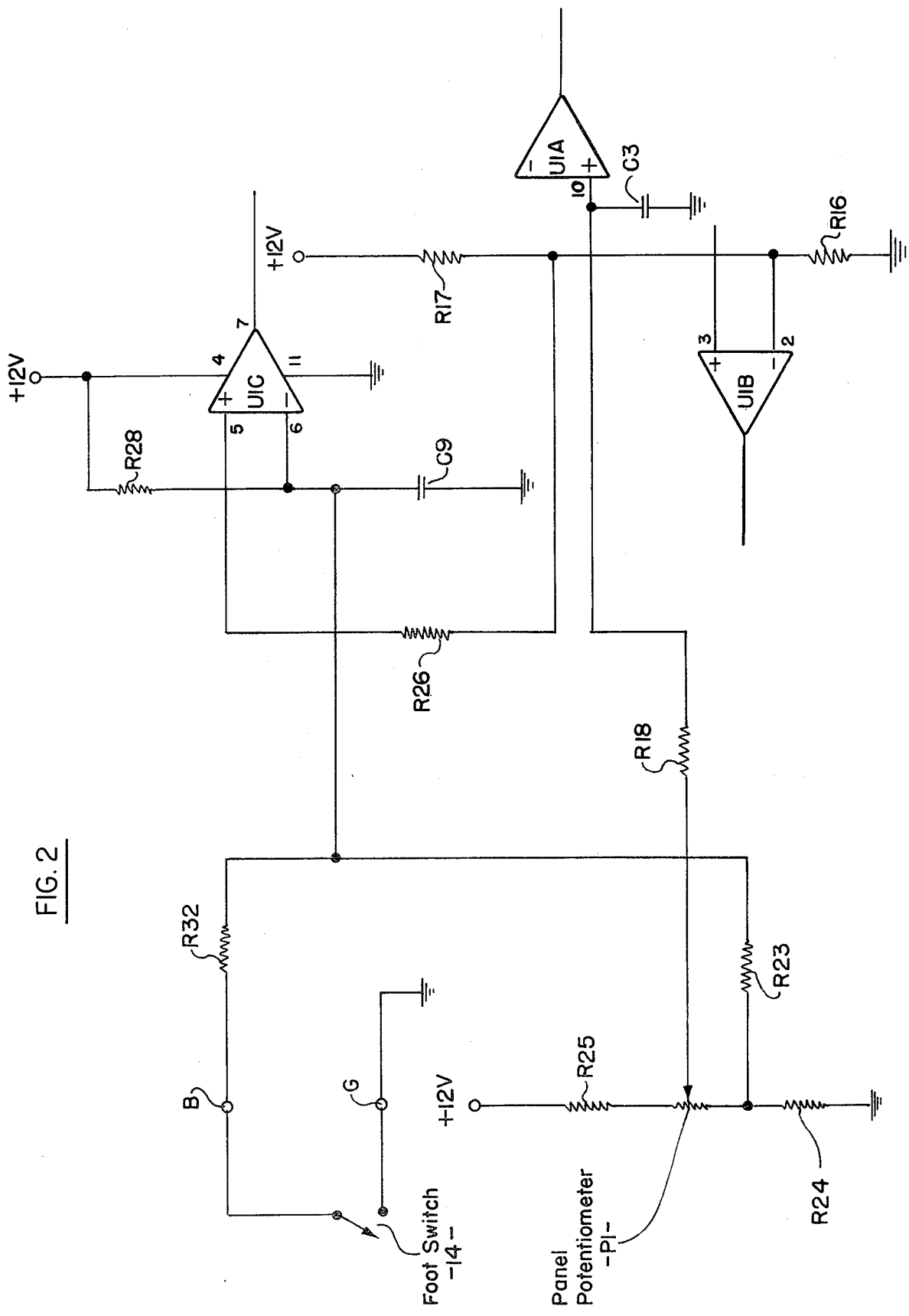
FIG. 2 is a fragmentary circuit diagram illustrating changes to the circuit of FIG. 1 to provide an embodiment in which speed control is effectuated only by the hand-controlled panel potentiometer, and a foot-operated switch is provided for turning the motor on or off.

As mentioned above, the fragmentary circuit of FIG. 2 shows portions of the system of FIG. 1 which are modified when the speed control is by the panel potentiometer P1 only, and in which the motor is turned on and off by a foot switch 14. Foot switch 14 is connected to ground and through a resistor R32 to the minus input of comparator U1C. The minus input of the comparator is also connected through a resistor R28 to the positive terminal of the 12-volt source, and through a resistor R26 to the minus input of the guardian circuit comparator U1B. The wiper of the panel potentiometer P1 is connected through resistor R18 to the plus input of speed control amplifier U1A.

In the latter circuit, the negative resistance generator and dynamic braking circuitry and guardian circuitry is rendered operative whenever the foot switch is closed, which causes the comparator U1C output to rise from zero to +12-volts, to back bias the diodes D3 and D4 in the latter circuit. Then, the speed control is achieved only by the panel potentiometer P1 which controls the voltage introduced to the speed control amplifier U1A.

The invention provides, therefore, an improved speed control system for an electric motor, whereby the speed of the motor may be conveniently and economically controlled. As described the system has a feature in that the motor is imparted constant speed characteristics in the presence of varying mechanical loads. Also, the system includes a guardian circuit which prevents the motor from becoming damaged by turning off the motor drive circuit in the presence of prolonged excessive loads.

It will be appreciated that while particular embodiments of the invention have been shown and described, modifications may be made. It is intended in the claims to cover the modifications which come within the spirit and scope of the invention.

What is claimed is:

1. A speed control system for an electric motor comprising: a first potentiometer; first circuitry connected to said first potentiometer; power amplifier circuitry connected to said first circuitry to supply power to the motor under control of said first potentiometer; disabling circuitry included in said power amplifier circuitry; a first comparator means connected to said first potentiometer and to said disabling circuitry for causing said disabling circuitry to disable said power amplifier circuitry when said first potentiometer is moved to an off position and to cause said power amplifier to be enabled when said first potentiometer is moved away from the off position; a second potentiometer; second circuitry connected to said second potentiometer and to said power amplifier circuitry to cause said power amplifier circuitry to supply power to the motor under the control of the second potentiometer; and second comparator means connected to said second potentiometer and to said first circuitry to disable said first circuitry when said second potentiometer is moved away from an off position.

2. The speed control system defined in claim 1, in which said power amplifier circuitry includes amplifier means, and means for creating feedback to said amplifier means to generate a negative resistance in said power amplifier circuitry to cancel the resistance of the rotor of said motor so as to provide constant speed characteristics to the motor under variable mechanical load conditions for any particular speed setting of the speed control system.

3. The speed control system defined in claim 1, and which includes guardian circuitry connected to said motor and to said disabling circuitry and actuable to an actuated condition to disable said power amplifier circuitry when the current in said motor exceeds a particular threshold.

4. The speed control system defined in claim 3, in which the guardian circuitry includes time constant network means to actuate said guardian circuitry to its actuated condition only when said current persists beyond a selected minimum time interval.

5. The speed control system defined in claim 3, in which the guardian circuitry includes a latching circuit to maintain said guardian circuitry in its actuated condition until said first potentiometer is returned to its off position.

6. The speed control system defined in claim 4, in which said time constant network means includes multiple time constant networks of selected time constants to prevent successive current surges of less than said selected minimum time interval from becoming cumulative.

7. The speed control system defined in claim 1, in which said power amplifier circuit includes dynamic braking network means connected to said motor to create a dynamic load on said motor whenever the speed thereof exceeds a selected speed setting.

* * * * *